US007856283B2

(12) United States Patent
Burk et al.

(10) Patent No.: US 7,856,283 B2
(45) Date of Patent: Dec. 21, 2010

(54) DIGITAL MICROPHONE INTERFACE, AUDIO CODEC AND METHODS FOR USE THEREWITH

(75) Inventors: Theodore Burk, Austin, TX (US); Daniel T. Bogard, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1361 days.

(21) Appl. No.: 11/344,274

(22) Filed: Jan. 31, 2006

(65) Prior Publication Data

US 2007/0133826 A1 Jun. 14, 2007

Related U.S. Application Data

(60) Provisional application No. 60/749,865, filed on Dec. 13, 2005.

(51) Int. Cl.

*G06F 17/00* (2006.01)
*H04R 3/00* (2006.01)
*H04R 1/40* (2006.01)
*H04J 3/00* (2006.01)

(52) U.S. Cl. .......................... 700/94; 381/111; 381/97; 370/498

(58) Field of Classification Search ................. 381/111, 381/122, 91, 92, 97; 710/58, 61; 370/478, 370/498, 516, 518, 530, 536; 375/362, 373
See application file for complete search history.

(56) References Cited

U.S. PATENT DOCUMENTS 4,370,523 A * 1/1983 Bader .......................... 381/92
5,051,799 A * 9/1991 Paul et al. ................... 375/242
5,185,768 A * 2/1993 Ferraiolo et al. ............ 375/373
5,768,316 A * 6/1998 Sogo .......................... 375/260
6,157,726 A * 12/2000 Carroll et al. .............. 381/94.5
6,157,727 A * 12/2000 Rueda ........................ 381/312
6,658,310 B1 * 12/2003 Kamiya ....................... 700/94
6,813,363 B2 * 11/2004 Vonlanthen ................. 381/313
6,853,733 B1 * 2/2005 Groothedde et al. ........ 381/111
6,895,098 B2 * 5/2005 Allegro et al. .............. 381/312
2006/0083388 A1 * 4/2006 Rothschild ................... 381/81
2006/0222186 A1 * 10/2006 Paige et al. .................. 381/81

OTHER PUBLICATIONS

AES42-2001 "AES standard for acoustics—Digital interface for microphones," Audio Engineering Society, Inc., Copyright 2001, May 31, 2001 printing.

* cited by examiner

*Primary Examiner*—Suhan Ni
*Assistant Examiner*—Jesse A Elbin

(57) ABSTRACT

A digital microphone interface includes a phase generator for generating a phase signal. A clock generator produces a digital microphone clock at a selected frequency based on the frequency select signal, and supplying the digital microphone clock to a digital microphone. A first data latch, operably coupled to the phase generator, produces a stream of first data from a first channel of the digital microphone, based on a phase select signal and the phase signal.

26 Claims, 11 Drawing Sheets

DIGITAL MICROPHONE INTERFACE, AUDIO CODEC AND METHODS FOR USE THEREWITH

CROSS REFERENCE TO RELATED PATENTS

The present application claims priority to U.S. Provisional Patent Application:

DIGITAL MICROPHONE INTERFACE, AUDIO CODEC AND METHODS FOR USE THEREWITH, having Ser. No. 60/749,865, filed on Dec. 13, 2005, which is incorporated herein by reference for all purposes and is related to the following U.S. patent applications that are commonly assigned:

AUDIO CODEC AND METHODS FOR USE THEREWITH, having Ser. No. 11/344,275, filed on Jan. 31, 2006; the contents of which are expressly incorporated herein in their entirety by reference thereto.

BACKGROUND OF THE INVENTION

1. Technical Field of the Invention

The present invention relates to digital microphone interfaces as may be used in audio codecs and related methods.

2. Description of Related Art

As is known, integrated circuits are used in a wide variety of electronic equipment, including portable, or handheld, devices. Such handheld devices include laptop, notebook and other personal computers, personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. As an example, a computer may include an audio codec integrated circuit to support the processing of audio signals in order to produce an audio output that is delivered to the user through speakers, headphones or the like.

One concern with the implementation of integrated circuits is the amount of power consumed and the amount of integrated circuit area required to implement a complex circuit. The need exists for power efficient circuits that can be efficiently implemented in an integrated circuit environment.

DETAILED DESCRIPTION OF THE INVENTION INCLUDING THE PRESENTLY PREFERRED EMBODIMENTS

Figure 1:
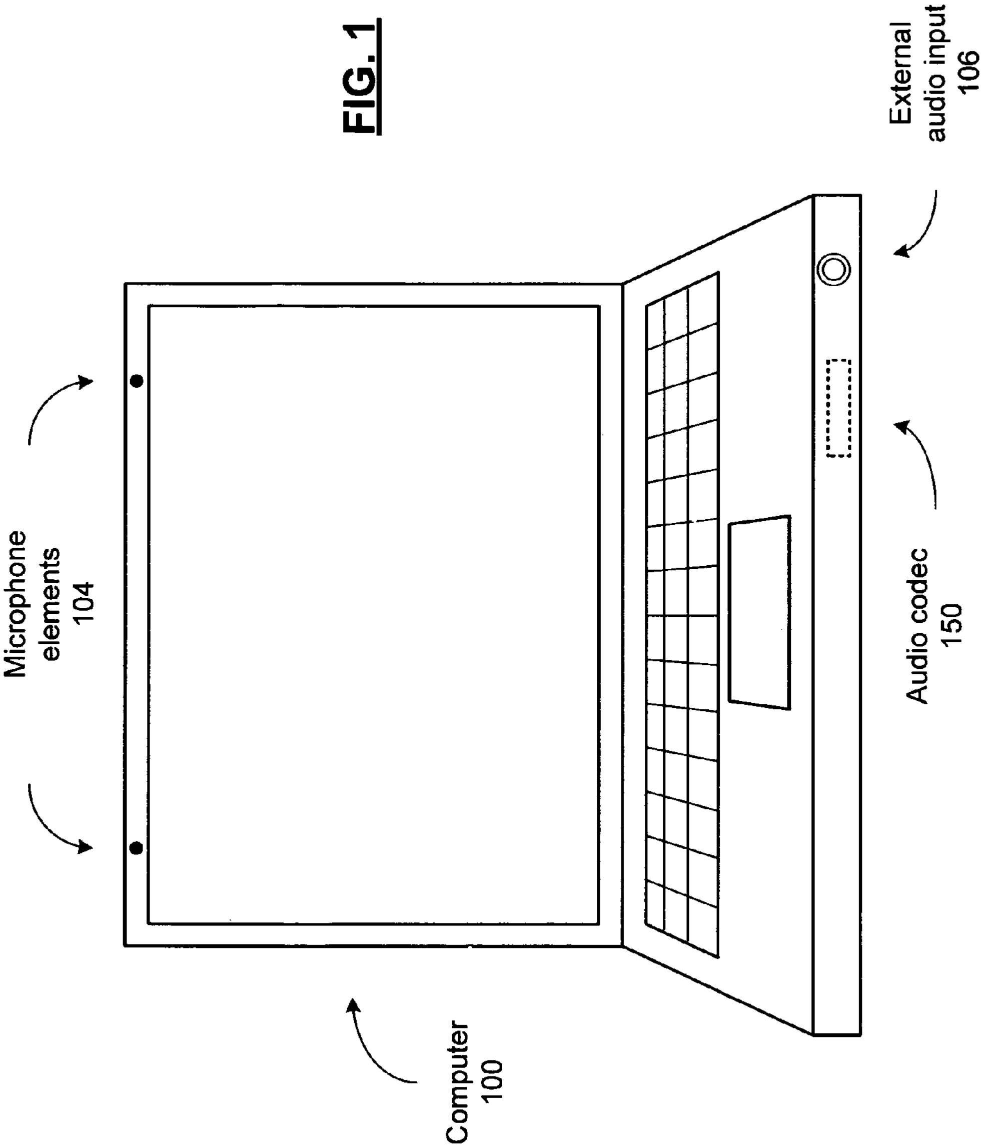
FIG. 1 presents a pictorial view of a computer in accordance with an embodiment of the present invention.

FIG. 1 presents a pictorial view of a computer in accordance with an embodiment of the present invention. In particular, computer 100 includes integrated microphone elements 104 for converting audio signals, such as speech signals, into digital signals using audio codec 150, for storage, use and/or processing by computer 100. In addition, computer 100 includes an external audio input 106 such as an input jack, for coupling external audio devices such as MP3 players, or CD players so that computer 100 may store, use and/or process the audio outputs therefrom.

Audio codec 150 includes various features and functions in accordance with the present invention that will be described in conjunction with the FIGs. that follow. While audio codec 150 is presented as a component used in computer 100, audio codec 150 may likewise be incorporated in other devices such as voice recorders, cell-phones, and other handheld audio devices, and other electronic devices that process analog audio signals into digital signals.

Figure 2:
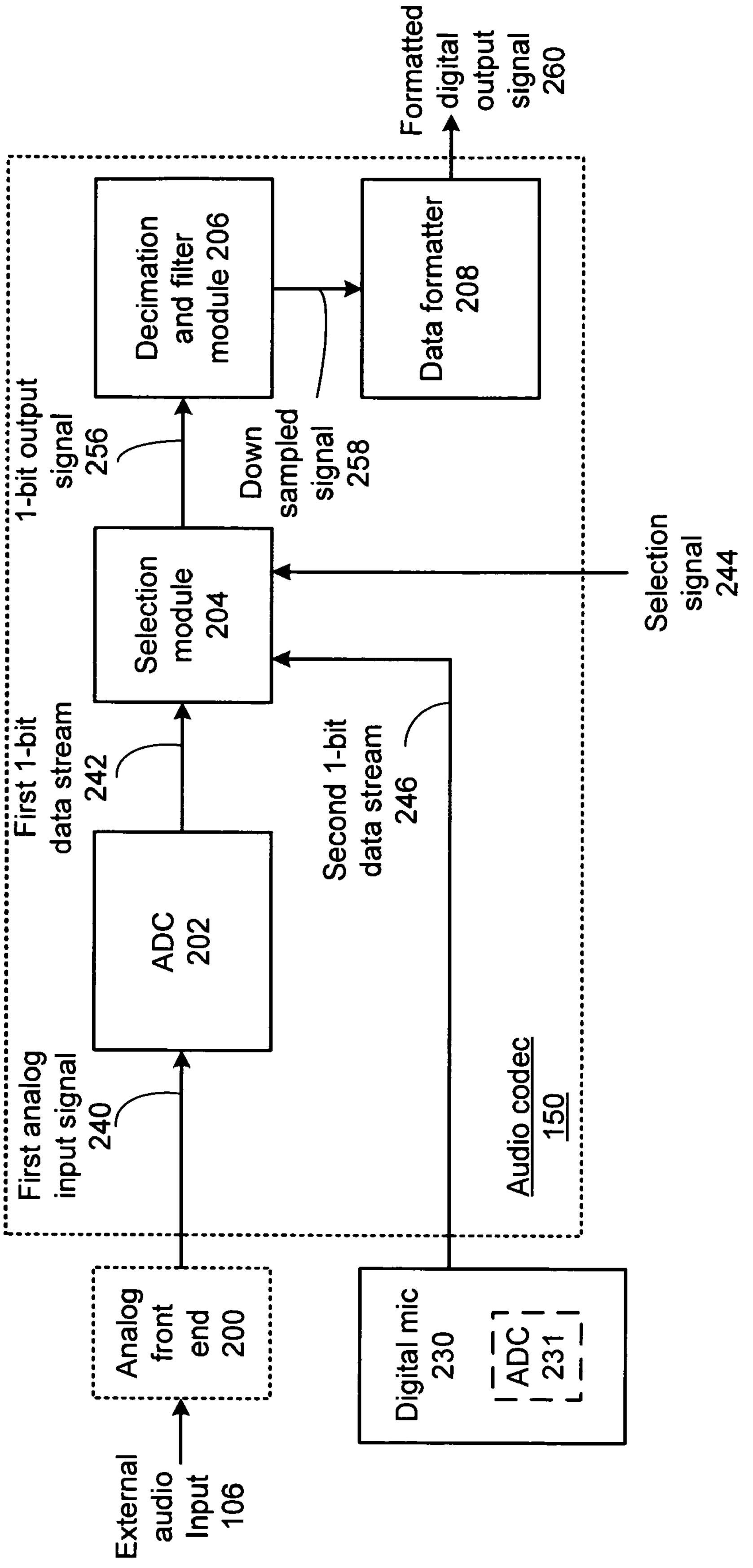
FIG. 2 presents a block diagram representation of an audio codec 150 in accordance with an embodiment of the present invention.

FIG. 2 presents a block diagram representation of an audio codec in accordance with an embodiment of the present invention. In particular, an embodiment of audio codec 150 is presented. Analog to digital converter (ADC) 202 produces a first one-bit data stream from first analog input signal 240 that is based on external audio input 106. First analog audio signal 106 has been optionally processed by analog front end 200 to amplify or attenuate the external audio input 106 to desired signal levels, and to provide optional filtration, isolation and/or protection of audio codec 150 from static discharge, input spikes, high voltages and high frequencies.

Digital microphone 230 can include one or more microphone elements such as microphone elements 104. In addition, digital microphone 230 includes an analog to digital converter 231 for producing a second one-bit data stream 246. Selection module 204 produces a one-bit output signal 256 that is the first one-bit data stream 242 when the selection signal 244 is in a first state, and for producing the one-bit output signal 256 that is the second one-bit data stream 246 when the selection signal 244 is in a second state. In an embodiment of the present invention, selection module 204 includes a multiplexer and the selection signal 244 is developed externally from the audio codec 150 in response to a user selection of the one of either the external audio input 106 or the digital microphone 230 as the selected source of audio content. In a further embodiment of the present invention, the selection signal 244 is automatically generated by determining that either the external audio input 106 or digital microphone 230 is producing a corresponding stream of data that represents audio information, other than noise, by determining that the sound pressure level is above a noise threshold.

Decimation and filter module 206 down samples and filters the one-bit output signal 256 by a factor of N to produce a down sampled signal 258. In an embodiment of the present invention, decimation and filter module 206 provides anti-aliasing filtration, prior to the down-sampling operation. In embodiments of the present invention, decimation and filter module 206 can include a infinite impulse response (IIR)

filter, a half band filter, a finite impulse response (FIR) filter, a Butterworth filter or other filter type.

Data formatter 208 processes the downsampled signal 258 to produce formatted digital audio signal 260. In an embodiment of the present invention, formatted digital output signal 260 is a 24-bit pulse code modulated (PCM) signal, however 20-bit and 16-bit PCM and other data formats including other multi-bit formats are also possible within the broad scope of the present invention. In an embodiment of the present invention, the data formatter 208 is programmable to any one of a plurality of data formats as described above.

In operation, a digital audio signal from either external audio input 106 or digital microphone 230 is processed by audio codec 150 into formatted digital output signal 260. In an embodiment of the present invention, ADC 202 has a first plurality of ADC characteristics and ADC 231 has a second plurality of ADC characteristics, wherein at least one of the first plurality of the ADC characteristics is different from a corresponding one of the second plurality of ADC characteristics. However, decimation and filtration module 206 processes the one-bit data stream for either source. This use of a single decimation and filtration module reduces the amount of power consumed by the circuit and also reduces and the amount of integrated circuit area required to implement audio codec 150 in an integrated circuit configuration.

In an embodiment of the present invention, the plurality of ADC characteristics includes an ADC type, such as a delta modulator, delta sigma modulator, multi-stage noise shaping (MASH), multi-bit quantizers, or other ADC circuit or configuration. Further ADC characteristics include an ADC order such as first order, second order or higher orders corresponding to the number of feedback loops, or integration stages included in a particular ADC type. In an embodiment of the present invention, ADC 202 is implemented using a second order delta sigma modulator and ADC 231 is implemented using a fourth order delta sigma modulator. While these two ADCs have the same ADC type (delta sigma modulators) they have a different ADC order (second, fourth). In accordance with this embodiment, at least one of the plurality of ADC characteristics of ADC 202 is therefore different from a corresponding one of the plurality of ADC characteristics of ADC 231.

Figure 3:
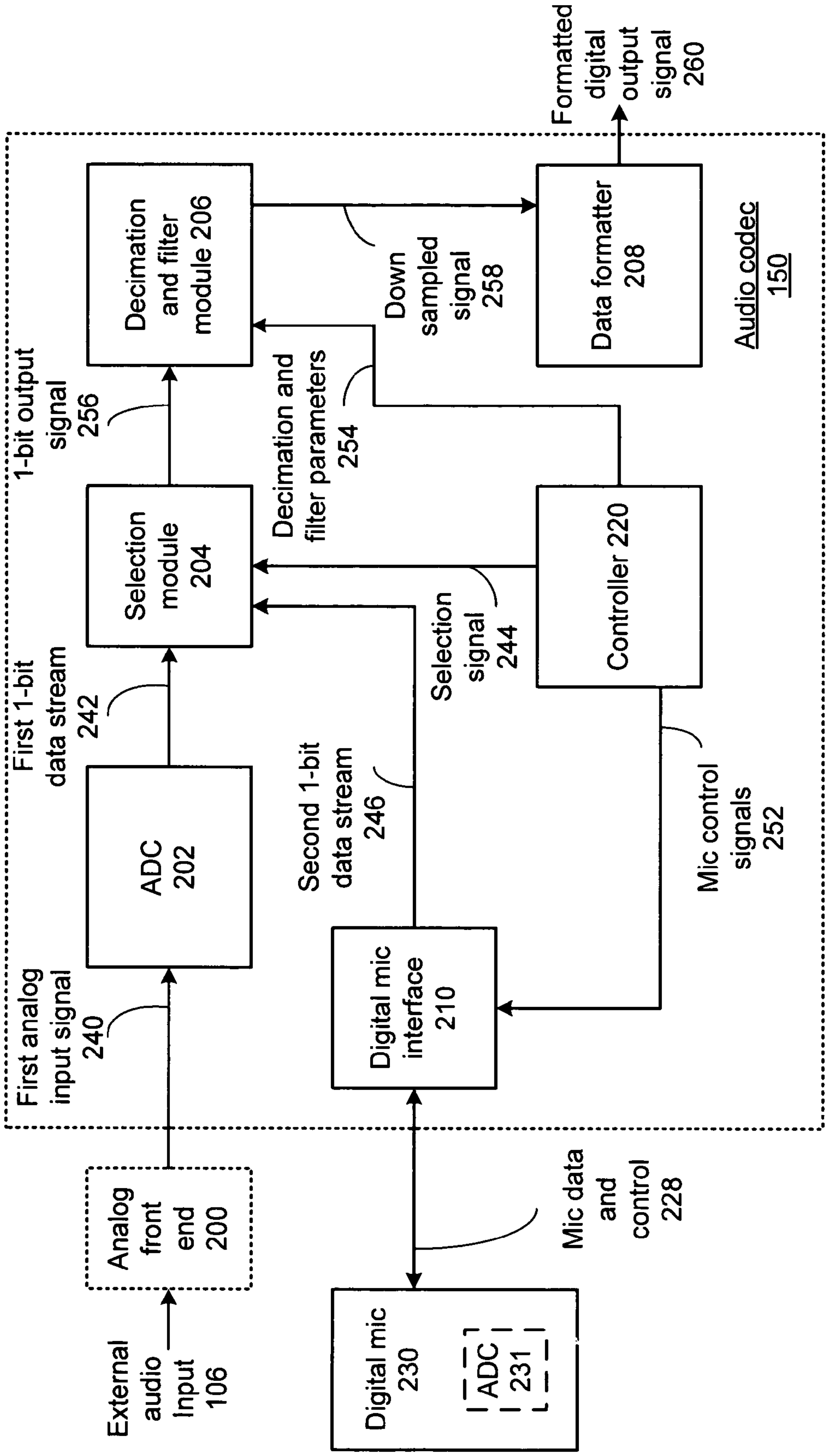
FIG. 3 presents a block diagram representation of an audio codec 150 in accordance with an embodiment of the present invention.

FIG. 3 presents a block diagram representation of an audio codec in accordance with an embodiment of the present invention. In addition to the elements described in conjunction with FIG. 2, this embodiment includes a digital microphone interface 210 that receives microphone control signals 252 from controller 220, shares microphone data and control information 228 with digital microphone 230 and produces second one-bit data stream 246. In an embodiment of the present invention, controller 220 produces the selection signal 244, either automatically or based on some input from a user.

In an embodiment of the present invention, decimation and filter module 206 is programmable based on decimation and filter parameters 254 and controller 220 modifies at least one decimation parameter and/or at least one filter parameter of the decimation and filter module when the selection signal is in the first state. For instance, the at least one decimation parameter can include the downsampling factor N, and the at least one filter parameter can include one or more of the coefficients, gains, corner frequencies or other parameters of a filter, such as a digital filter that is included in decimation and filter module 206. This allows one or more parameters of decimation and filter module to be customized based on the particular ADC characteristics of ADC 202 and ADC 231. In an embodiment of the present invention, the decimation and filter module is programmable based on the decimation and filter parameters 254 to produce a multi-bit output such as a 16, 20, 24 or 32 bit output or other multi-bit output.

In operation, controller 220 can program decimation and filter module 206 with one set of decimation and filter parameters 254 when processing the first one-bit data stream from ADC 202. Further, controller 220 can program decimation and filter module 206 with a second set of decimation and filter parameters 254 when processing the second one-bit data stream from ADC 231. As described herein the first state and the second state correspond to two data streams and not to any particular order or priority between the two data streams.

In an embodiment of the present invention, one or more components of audio codec 150, such as ADC 202, the digital microphone interface 210, selection module 204, the decimation and filter module 206, controller 220 and data formatter 208, can be implemented as all or part of a system on the chip integrated circuit (IC). However, in an embodiment of the present invention, various functions and features can be implemented as one or more operational instructions that are executed by a processor of a computer, an integrated circuit or other electronic device.

Figure 4:
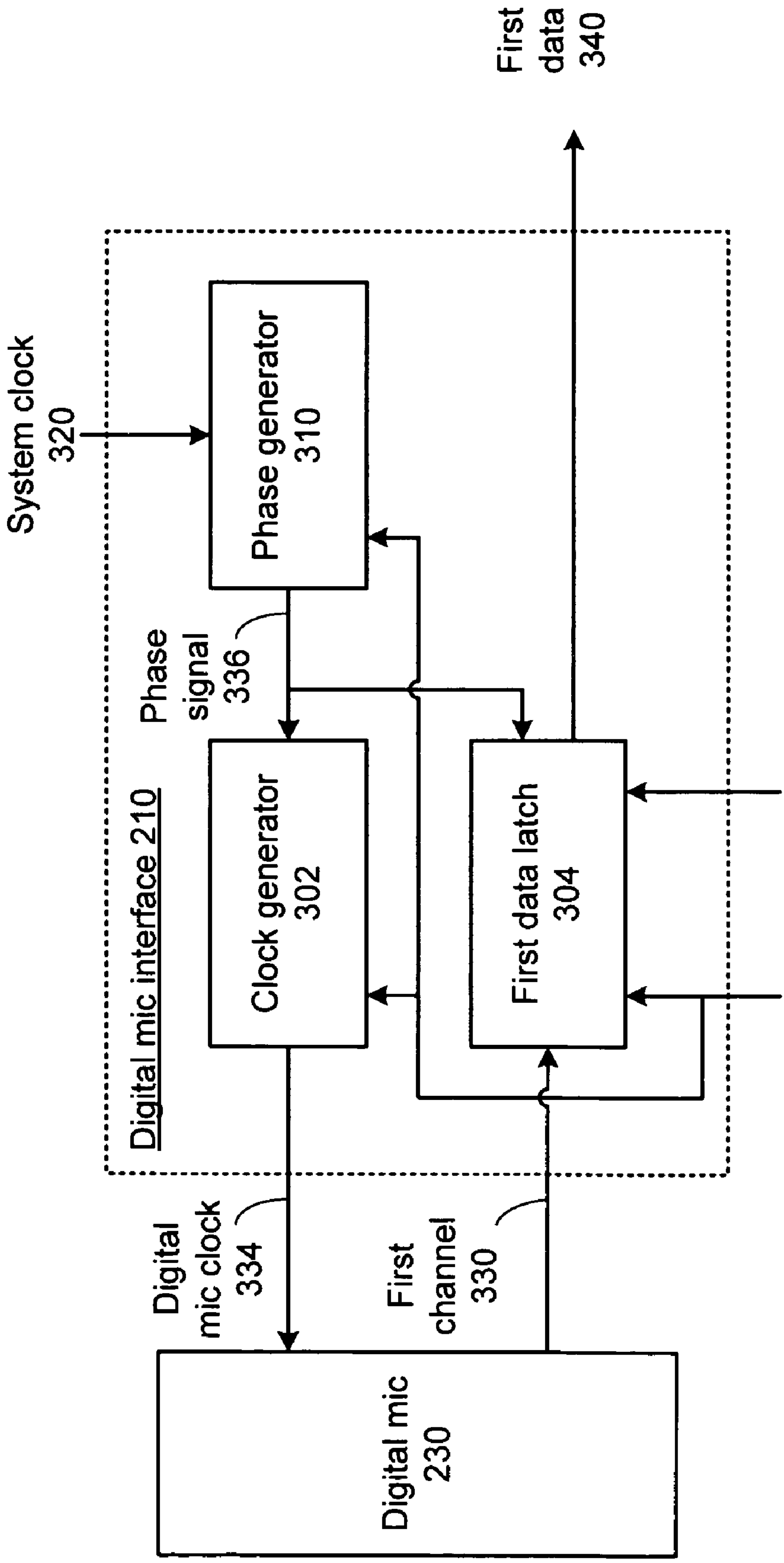
FIG. 4 presents a block diagram representation of a digital microphone interface in accordance with an embodiment of the present invention.

FIG. 4 presents a block diagram representation of a digital microphone interface in accordance with an embodiment of the present invention. In particular, an embodiment of digital microphone interface 210 is presented wherein microphone control signals 252 include frequency select signal 322 and phase select signal 324. Further microphone data and control 228 includes a digital microphone clock and a first channel 330.

In operation, phase generator 310 generates a phase signal based on a system clock 320 and a frequency select signal 322. Clock generator 302 produces a digital microphone clock at a selected frequency based on the frequency select signal and phase signal 336, and supplies the digital microphone clock 334 to digital microphone 230. First data latch 304 produces a stream of first data 340, such as second one-bit data stream 246, from first channel 330 of the digital microphone, based on the phase select signal 324 and the phase signal 336. In this fashion, digital microphone interface 210 supplies the clock signal to digital microphone 230 and controls the sampling frequency and phase of the data from first channel 330. This provides greater flexibility in programming the operation of digital microphone interface 210 to different digital microphones and further allows the digital microphone interface to be adapted to the operation of a particular digital microphone.

Figure 5:
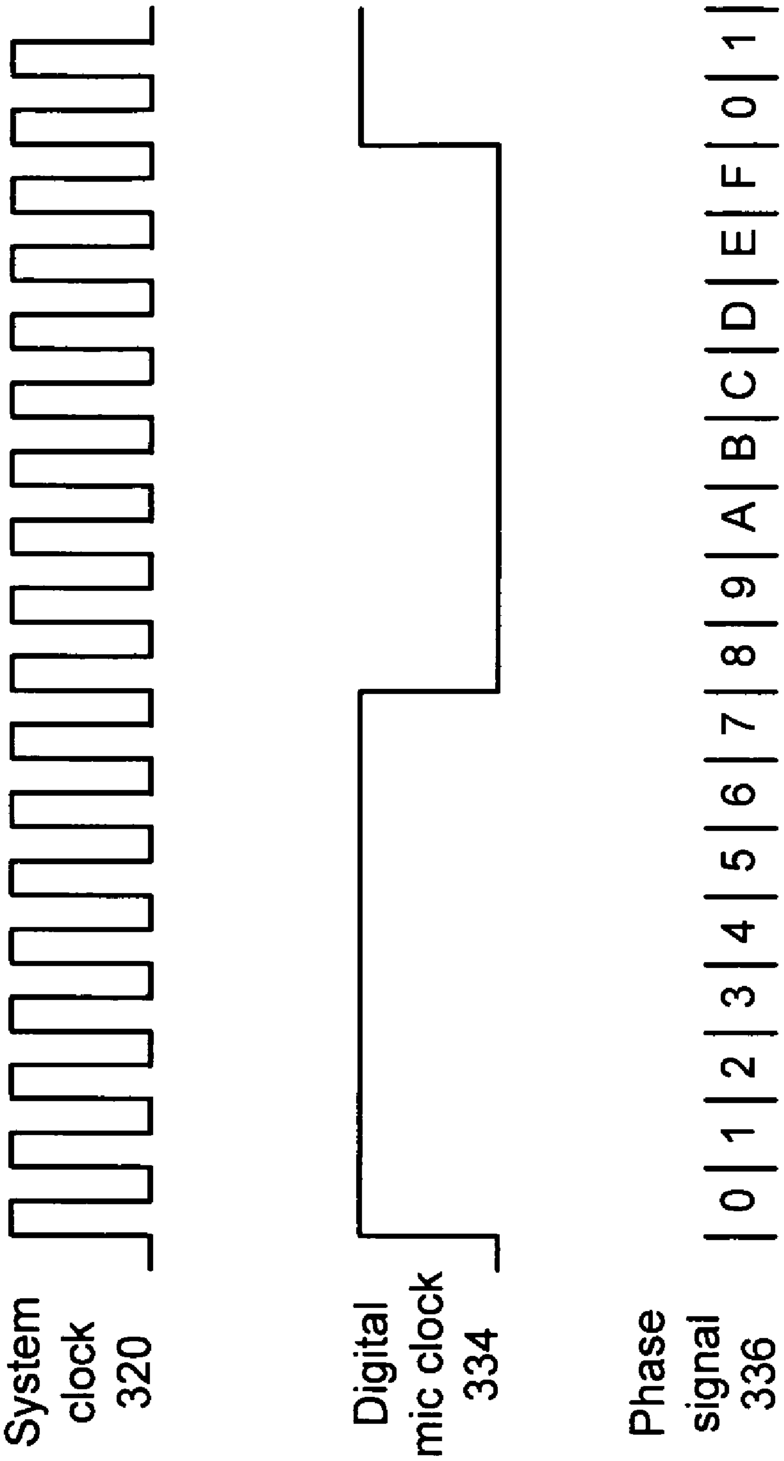
FIGS. 5 and 6 present graphical representations of various signals in accordance with an embodiment of the present invention.
Figure 6:
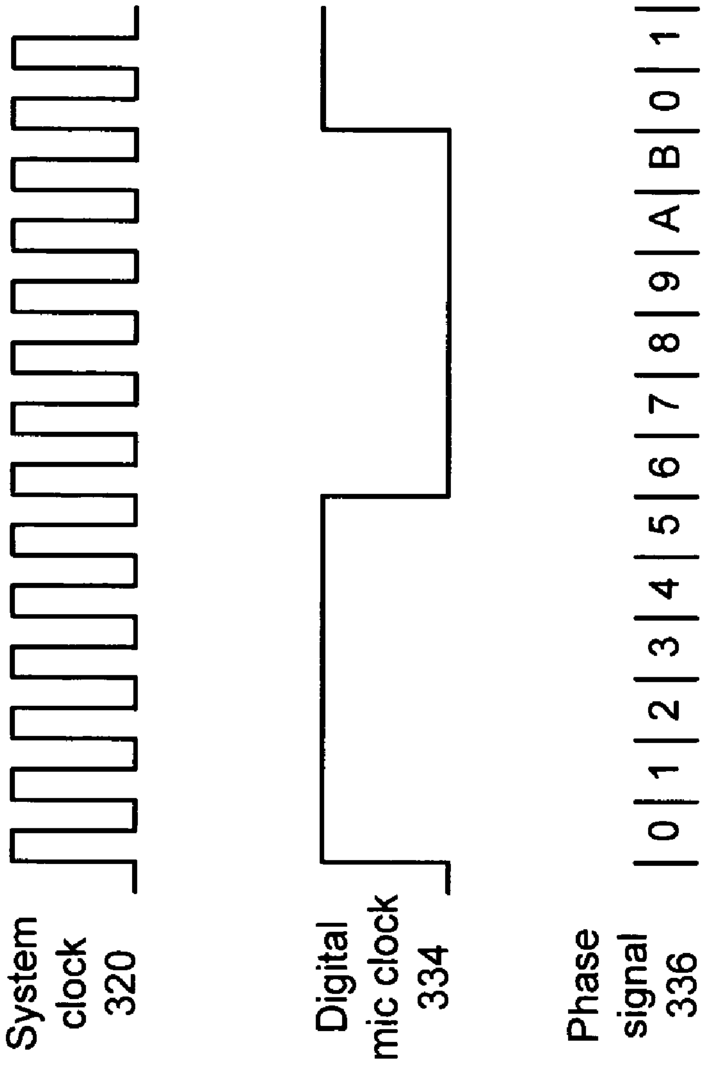

FIGS. 5 and 6 present graphical representations of various signals in accordance with an embodiment of the present invention. In this embodiment, phase generator 310 is implemented with a programmable counter. In particular, FIGS. 5 and 6 illustrate an embodiment of the present invention wherein the phase generator 310 is implemented with a four-bit counter, however, a greater or lesser number of bits may likewise be implemented within the broad scope of this embodiment. For a first selected frequency, phase generator 310 provides an incrementing phase signal 336 that corresponds to a phase count from one to 16 (or 0 to F when represented in hexadecimal numbers) over sixteen cycles of system clock 320. Digital microphone clock 334 is generated by clock generator 302 based on phase signal 336, for the first selected frequency by creating a falling edge when the phase sign 336 is equal to "7" and a rising edge when the phase signal 336 is equal to "F".

In this embodiment, first data latch 304 latches the data from first channel 330 when the phase signal 336 is equal to a first latch phase selected by the phase select signal 324. In an embodiment of the present invention, the first phase select signal 324 is a 2-bit signal that includes four possible latch phases, such as rising edge phase (when the phase signal 336 is F), a midpoint high phase (when the phase signal 336 is 3), a falling edge phase (when the phase signal is 7), and a midpoint low phase (when the phase signal 336 is B).

In an embodiment of the present invention, the data from the first channel 330 is sampled at one phase value of phase signal 336 for each cycle of digital microphone clock 334. For example, first data latch 304 can latch the data from first channel 330 at a first latch phase, set by phase select signal 324 to allow the data from first channel 330 to settle as long as possible. In this example, a first latch phase of F is selected. The first data latch 304 will then proceed to latch the data stream of first channel 330 when the phase signal 336 is equal to the first latch phase.

As discussed above, the clock generator 302, phase generator 310 and first data latch 304 are each responsive to frequency select signal 322 that is capable of programming these devices to a plurality of different frequencies. If, for example, the frequency of system clock 320 is 48 MHz, then, for the example discussed above, the frequency of the digital microphone clock 334 is (1/16)48 MHz=3 MHz. In an embodiment of the present invention, the frequency select signal 322 is a 2-bit signal that takes on four values however, other values either greater or less may likewise be implemented, based on the implementation of phase generator 310 and particularly, the number of bits used.

FIG. 6 presents a further example where a higher frequency is selected by frequency select signal 322. In response, phase generator 310 resets when it reaches a phase of B after 12 cycles of the system clock 320. Digital microphone clock 334 changes states at phases 5 and B of phase signal 336. In this embodiment, if first data latch 304 allows the data from first channel 330 to settle as long as possible, first data latch 304 will then proceed to latch the first data stream when the phase signal is equal to B. If, for example, the frequency of system clock 320 is 48 MHz, then, for the example discussed above, the frequency of the digital microphone clock 334 is (1/12)48 MHz=4 MHz.

While the foregoing description provides a counter implementation of phase generator 310, in alternative embodiments of the present invention, other circuitry including other digital and analog circuitry may be used to generate the phase signal 336 used by other components of digital microphone interface 210.

Figure 7:
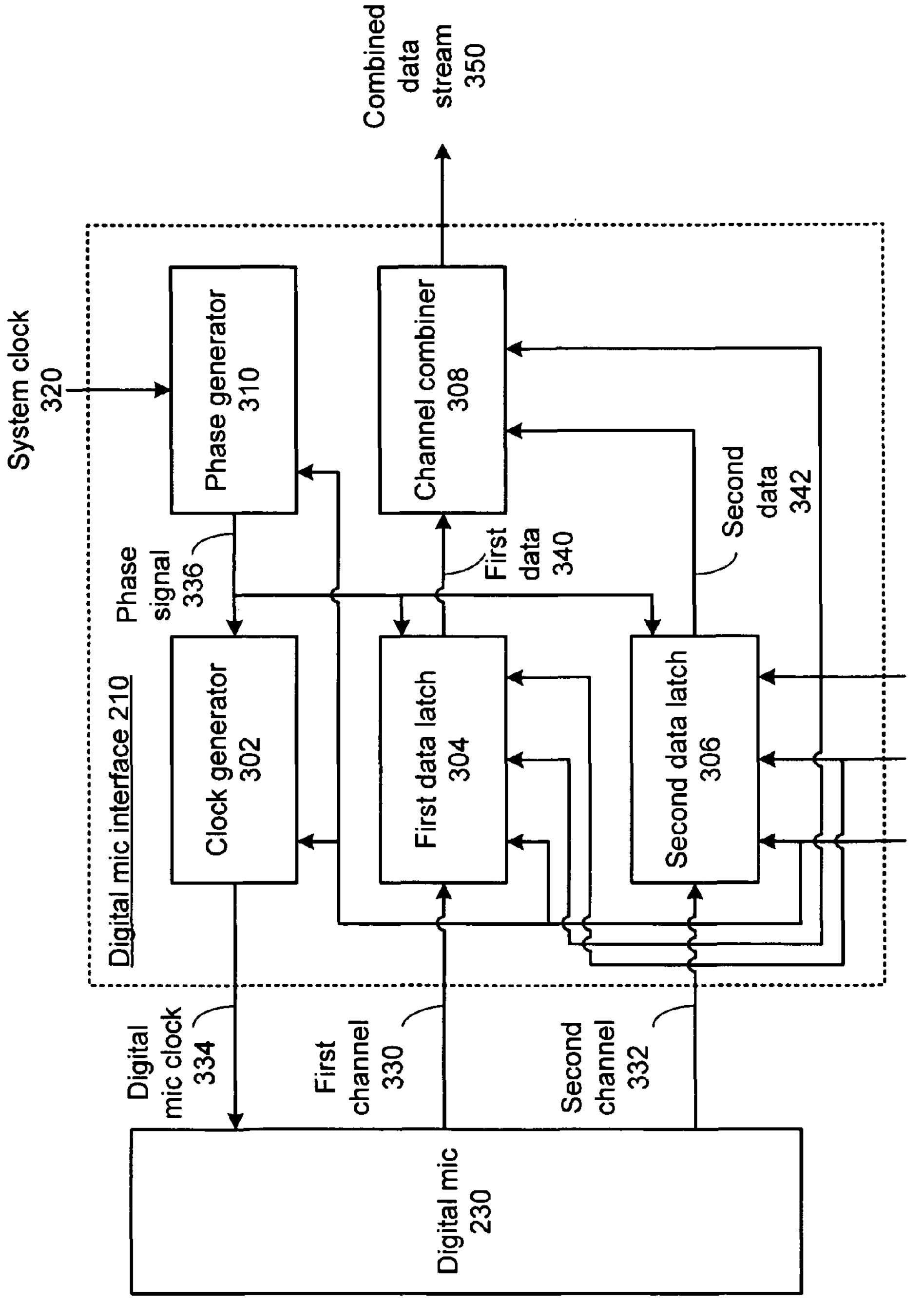
FIG. 7 presents a block diagram representation of a digital microphone interface in accordance with an embodiment of the present invention.

FIG. 7 presents a block diagram representation of a digital microphone interface in accordance with an embodiment of the present invention. In this embodiment, digital microphone 230 has a second channel 332. Microphone control signals 252 include a mode select signal 326 that is a 2-bit signal, however, greater or lesser number of bits can likewise be implemented. In an embodiment of the present invention, three modes are possible: a two channel monaural mode, a first channel stereo mode and a second channel stereo mode. In the monaural mode, separate data are collected from the first channel 330 and the second channel 332. Channel combiner 308, in response to a selection of monaural mode of mode selection signal 326, combines the first data 340 and second data 342 into a combined data stream 350. In this mode, second data latch 306 operates on second channel 332, based on the phase select signal 324 and the phase signal 336 in a similar fashion to first data latch 304 described in conjunction with FIGS. 4-6. The first data latch 304 latches the first channel 330 at one phase value of the phase signal 336 (such as B or F depending on the selected frequency). Also the second data latch 306 latches the second channel 332 at one phase value of the phase signal 336 (such as B or F depending on the selected frequency).

In an embodiment of the present invention, combined data stream 350 is a multiplexed signal such as a time division multiplexed signal that includes two separate audio channels corresponding to the first channel 330 and the second channel 332. However, in further embodiments, channel combiner 308 includes a processor for combining the first channel 330 and the second channel 332 based on more complex gain and phase adjustments to implement beam forming, noise cancellation or other processing techniques based on multiple microphone elements. Further, while the foregoing description includes a first and second data channels 330 and 332, likewise, a greater number of channels (such as four or more channels, such as from four or more microphones) could be processed by a greater number of data latches, or by each data latch latching at two or more phase values of phase signal 336. In accordance with these further embodiments, combined data stream 350 may include data from a single processed audio channel or from multiple channels on a single input.

In the first channel stereo mode, a full stereo signal is derived from only the first channel 330. In response to this selection of mode selection signal 326, second data latch 306 can be disabled. In this mode, first data channel 330 includes data in response to both the rising and falling edge of digital microphone clock 334 and therefore has two data values for each cycle of digital microphone clock 334. In response, the first data latch 304 latches the first channel 330 at two phase values of the phase signal 336 (such as [7, F] or [5, B], based on the selected frequency). In an embodiment of the present invention, phase select signal 324 includes a first latch phase and a second latch phase (such as [7, F] or [5, B]) when the first channel stereo mode is selected.

In the second channel stereo mode, a full stereo signal is derived from only the second channel 332. In response to this selection of mode selection signal 326, first data latch 304 can be disabled. In this mode, second data channel 332 includes data in response to both the rising and falling edge of digital microphone clock 334 and therefore has two data values for each cycle of digital microphone clock 334. In response, the second data latch 306 latches the second channel 332 at two phase values of the phase signal 336 (such as [7, F] or [5, B], based on the selected frequency), as described above in conjunction with the first channel stereo mode.

Figure 8:
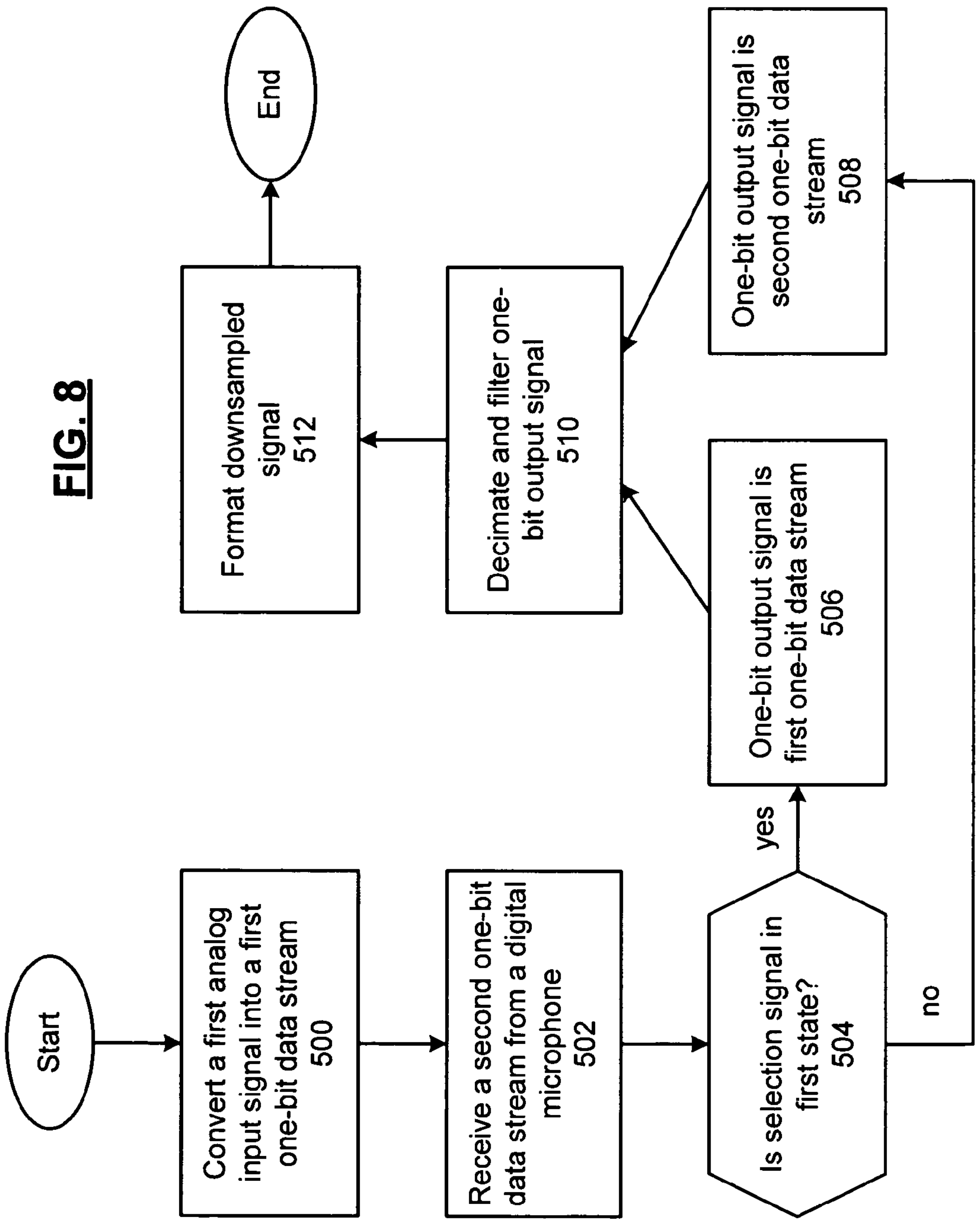
FIG. 8 presents a flowchart representation of a method in accordance with the present invention.

FIG. 8 presents a flowchart representation of a method in accordance with the present invention. In particular, a method is presented for use in conjunction with the functions and features described in conjunction with FIGS. 1-7. The method begins in step 500 by converting a first analog input signal into a first one-bit data stream. In step 502, a second one-bit data stream is received from a digital microphone. In step 504 the method determines if a selection signal is in a first state. A one-bit output signal that is the first one-bit data stream is produced when a selection signal is in a first state as shown in step 506. The one-bit output signal is the second one-bit data stream when the selection signal is in a second state as shown in step 508. In step 510 the method proceeds by decimating and filtering the one-bit output signal with a decimation and filter module to produce a down sampled signal. In step 512, the down sampled signal is formatted to produce a formatted digital audio signal.

Figure 9:
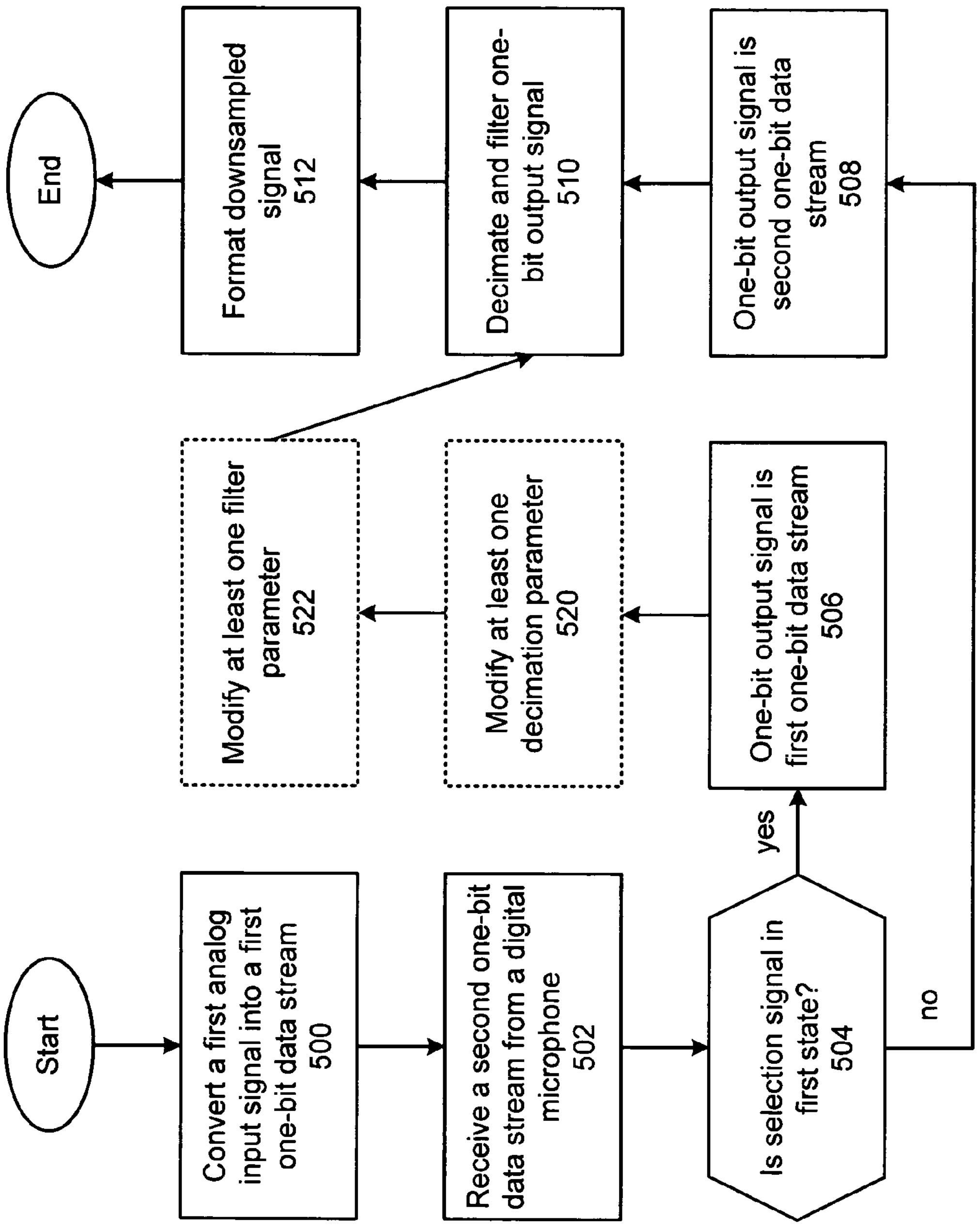
FIG. 9 presents a flowchart representation of a method in accordance with the present invention.

FIG. 9 presents a flowchart representation of a method in accordance with the present invention. In particular, a method is presented for use in conjunction with the functions and features described in conjunction with FIGS. 1-8. Further the method of FIG. 9 is modified by adding the optional step 520 of modifying at least one decimation parameter of the decimation and filter module when the selection signal is in the first state. In addition, optional step 522 is included for modifying at least one filter parameter of the decimation and filter module when the selection signal is in the first state.

Figure 10:
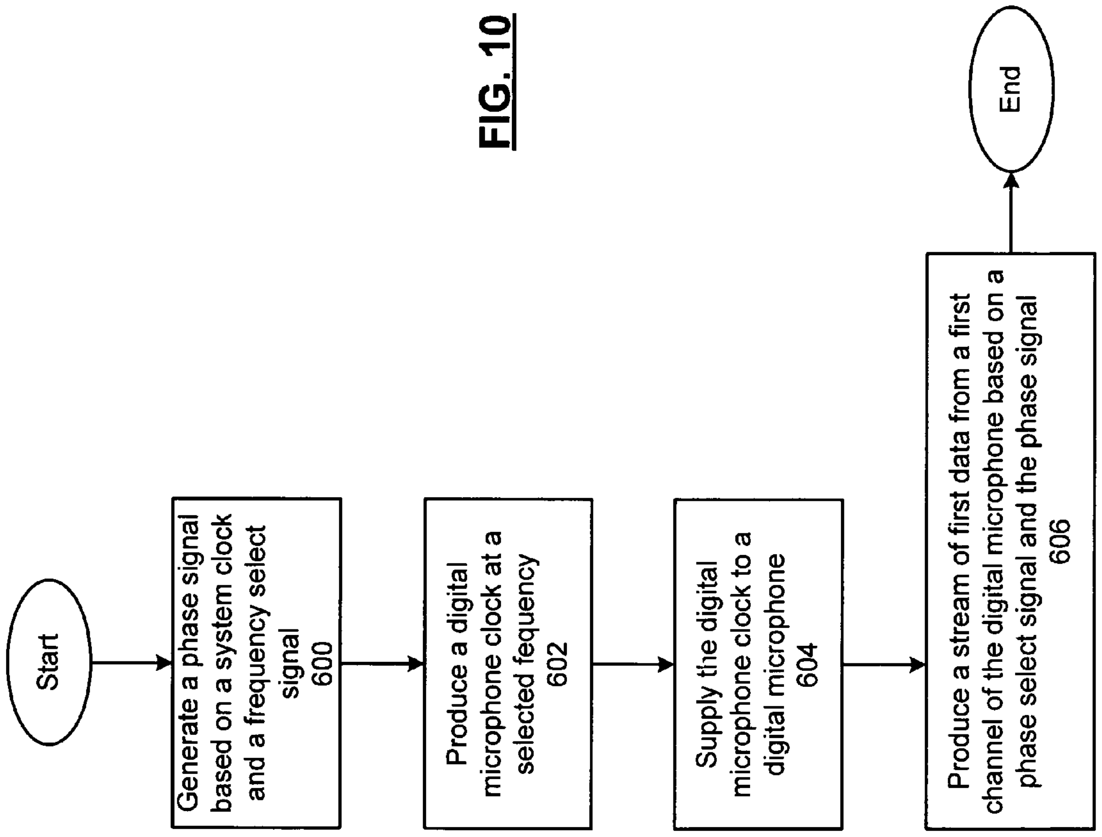
FIG. 10 presents a flowchart representation of a method in accordance with the present invention.

FIG. 10 presents a flowchart representation of a method in accordance with the present invention. In particular, a method is presented for use in conjunction with the functions and features described in conjunction with FIGS. 1-9. The method begins in step 600 by generating a phase signal based on a system clock and a frequency select signal. A digital microphone clock is produced in step 602 at a selected frequency based on the frequency select signal. In step 604, the digital microphone clock is supplied to a digital microphone. In step 606, a stream of first data is produced from a first channel of the digital microphone, based on a phase select signal and the phase signal.

Figure 11:
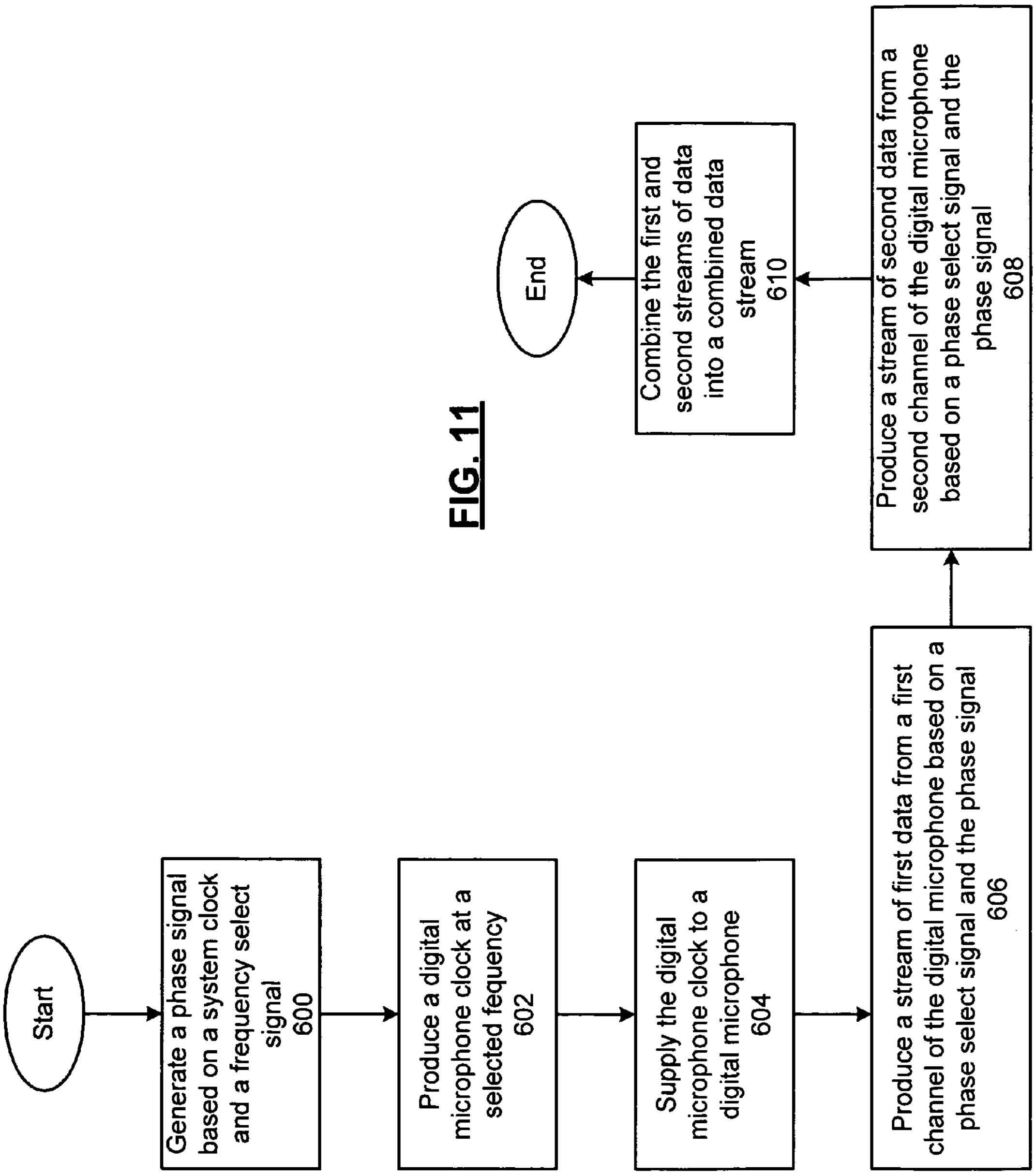
FIG. 11 presents a flowchart representation of a method in accordance with the present invention.

FIG. 11 presents a flowchart representation of a method in accordance with the present invention. In particular, a method is presented for use in conjunction with the functions and features described in conjunction with FIGS. 1-9. In addition to the step of FIG. 10 the method includes step 608 for producing a stream of second data from a second channel of the digital microphone, based on the phase select signal and the phase signal. In step 610, the first stream of data and the second stream of data are combined into a combined data stream.

While the digital microphone interface 210 has been described in terms of its uses in conjunction with an audio codec such as audio codec 150, digital microphone interface 210 may likewise be used in other audio codec designs and in conjunction with other electronic circuits and devices apart from an audio codec within the broad scope of the present invention.

The various processors disclosed herein can be implemented using a microprocessor, micro-controller, digital signal processor, microcomputer, central processing unit, field programmable gate array, programmable logic device, state machine, logic circuitry, analog circuitry, digital circuitry, optical circuitry, optical/mechanical devices and/or any device that manipulates signals (analog and/or digital) based on operational instructions that are stored in memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions illustrated herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies including other transistor, diode and resistive logic, both integrated or non-integrated, either electronic, optical or optical/mechanical may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a digital microphone interface and audio codec. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A digital microphone interface comprising:

a phase generator, operably coupled to a system clock and a frequency select signal for generating a phase signal;

a clock generator, operably coupled to a system clock signal and the phase generator, for producing a digital microphone clock at a selected frequency based on the frequency select signal, and for supplying the digital microphone clock to a digital microphone; and a first data latch, operably coupled to the phase generator, for producing a stream of first data from a first channel of the digital microphone, based on a phase select signal and the phase signal.

2. The digital microphone interface of claim 1 wherein the first phase select signal includes a first latch phase and wherein the first data latch latches the first data stream when the phase signal is equal to the first latch phase.

3. The digital microphone interface of claim 1 further comprising:

a second data latch, operably coupled to the counter, for producing a stream of second data from a second channel of the digital microphone, based on the phase select signal and the phase signal.

4. The digital microphone interface of claim 3 further comprising:

a channel combiner, for combining the first stream of data and the second stream of data into a combined data stream.

5. The digital microphone interface of claim 4 wherein the channel combiner is operably coupled to a mode select signal, and wherein the channel combiner combines the first stream of data and the second stream of data into the combined data stream, when the mode select signal indicates a monaural mode.

6. The digital microphone interface of claim 1 wherein the first data latch is operably coupled to a mode select signal, and wherein the first data latch is disabled if the first channel is not selected.

7. The digital microphone interface of claim 1 wherein the first data latch is operably coupled to a mode select signal, and wherein the first data latch latches the stream of first data at one phase value of the phase signal when the mode select indicates a monaural mode.

8. The digital microphone interface of claim 1 wherein the first data latch is operably coupled to mode select signal, and wherein the first data latch latches the stream of first data at two phase values of the phase signal when the mode select indicates a stereo mode.

9. The digital microphone interface of claim 1 wherein the phase select signal includes one of: a rising edge phase, a midpoint high phase, a falling edge phase, and a midpoint low phase.

10. An audio codec comprising:

a phase generator, operably coupled to a system clock and a frequency select signal for generating a phase signal;

a clock generator, operably coupled to a system clock signal and the phase generator, for producing a digital microphone clock at a selected frequency based on the frequency select signal, and for supplying the digital microphone clock to a digital microphone;

a first data latch, operably coupled to the phase generator, for producing a stream of first data from a first channel of the digital microphone, based on a phase select signal and the phase signal;

a decimation and filter module, operably coupled to the stream of first data, for producing a down sampled signal; and a data formatter, operably coupled to the down sampled signal, for producing a formatted digital audio signal.

11. The audio codec of claim 10 wherein the first phase select signal includes a first latch phase and wherein the first data latch latches the first data stream when the phase signal is equal to the first latch phase.

12. The audio codec of claim 10 further comprising:

a second data latch, operably coupled to the counter, for producing a stream of second data from a second channel of the digital microphone, based on the phase select signal and the phase signal.

13. The audio codec of claim 12 further comprising:

a channel combiner, for combining the first stream of data and the second stream of data into a combined data stream;

wherein the decimation and filter module produces the down sampled signal based on the combined data stream.

14. The audio codec of claim 13 wherein the channel combiner is operably coupled to a mode select signal, and wherein the channel combiner combines the first stream of data and the second stream of data into the combined data stream, when the mode select signal indicates a monaural mode.

15. The audio codec of claim 10 wherein the first data latch is operably coupled to a mode select signal, and wherein the first data latch is disabled if the first channel is not selected.

16. The audio codec of claim 10 wherein the first data latch is operably coupled to a mode select signal, and wherein the first data latch latches the stream of first data at one phase value of the phase signal when the mode select indicates a monaural mode.

17. The audio codec of claim 10 wherein the first data latch is operably coupled to mode select signal, and wherein the first data latch latches the stream of first data at two phase values of the phase signal when the mode select indicates a stereo mode.

18. The audio codec of claim 10 wherein the phase select signal includes one of: a rising edge phase, a midpoint high phase, a falling edge phase, and a midpoint low phase.

19. A method comprising:

generating a phase signal based on a system clock and a frequency select signal;

producing a digital microphone clock at a selected frequency based on the frequency select signal;

supplying the digital microphone clock to a digital microphone;

producing a stream of first data from a first channel of the digital microphone, based on a phase select signal and the phase signal.

20. The method of claim 19 wherein the first phase select signal includes a first latch phase and wherein the step of producing a stream of first data includes latching the first data stream when the phase signal is equal to the first latch phase.

21. The method of claim 19 further comprising:

producing a stream of second data from a second channel of the digital microphone, based on the phase select signal and the phase signal.

22. The method of claim 21 further comprising:

combining the first stream of data and the second stream of data into a combined data stream.

23. The method of claim 22 wherein the channel combiner combines the first stream of data and the second stream of data into the combined data stream, when a mode select signal indicates a monaural mode.

24. The method of claim 19 wherein the step of producing a stream of first data includes latching the stream of first data at one phase value of the phase signal when a mode select indicates a monaural mode.

25. The method of claim 19 wherein the step of producing a stream of first data includes latching the stream of first data at two phase value of the phase signal when a mode select indicates a stereo mode.

26. The method of claim 19 wherein the phase select signal includes one of: a rising edge phase, a midpoint high phase, a falling edge phase, and a midpoint low phase.

* * * * *